US010093001B1

(12) United States Patent
Hock

(10) Patent No.: US 10,093,001 B1
(45) Date of Patent: Oct. 9, 2018

(54) RATCHET WRENCH INTERFACE SYSTEM

(71) Applicant: Brent Louis Hock, Mansfield, TX (US)

(72) Inventor: Brent Louis Hock, Mansfield, TX (US)

( * ) Notice: Subject to any disclaimer, the term of this patent is extended or adjusted under 35 U.S.C. 154(b) by 108 days.

(21) Appl. No.: 15/093,150

(22) Filed: Apr. 7, 2016

Related U.S. Application Data

(60) Provisional application No. 62/144,595, filed on Apr. 8, 2015.

(51) Int. Cl.
*B25B 13/12* (2006.01)
*B25B 13/46* (2006.01)
*B25B 13/50* (2006.01)

(52) U.S. Cl.
CPC ............ *B25B 13/12* (2013.01); *B25B 13/462* (2013.01); *B25B 13/5058* (2013.01)

(58) Field of Classification Search
CPC .................................................... B25B 13/462
USPC .......................................................... 81/58.2
See application file for complete search history.

(56) References Cited

U.S. PATENT DOCUMENTS 728,945 A 5/1903 Levy
2,465,695 A 3/1949 Osborne
2,704,479 A 1/1953 Stang
2,645,966 A 7/1953 Mead
2,758,493 A 8/1956 Goldwater
3,004,455 A 10/1961 Bashore et al.
4,027,558 A * 6/1977 Fish ...................... B25B 13/461 81/185
4,924,735 A 5/1990 Lee
5,671,643 A 9/1997 Henkhaus
6,330,840 B1 10/2001 McCormick et al.
7,159,491 B1 * 1/2007 Chaconas ............... B25B 13/06 81/124.3
7,380,481 B2 6/2008 Barnett et al.
7,849,767 B1 * 12/2010 Wessel, IV ........... B25B 15/001 81/177.2
8,205,529 B1 * 6/2012 Laurie ................... B25B 13/463 81/177.85
9,056,389 B2 * 6/2015 Buchanan ............. B25B 13/461
2007/0234854 A1 10/2007 Collins
2012/0067177 A1 3/2012 Yu
2012/0260775 A1 10/2012 Lance et al.

OTHER PUBLICATIONS

Perfecto Products Catalog; undated; pp. 7-10; Perfecto Products, Inc.; Fullerton, California USA.

* cited by examiner

*Primary Examiner* — Hadi Shakeri
(74) *Attorney, Agent, or Firm* — Guy V. Manning, Esq.

(57) ABSTRACT

A right-angle socket for ratchet tools includes a hexagonal drive port adapted to receive interchangeable interface fittings, or adapters, which accept ratchet drives from various styles of ratchets. The interface fitting journals within and coaxial with the hexagonal drive port and is held in place by a keeper such as a spring ball. A coaxial port within the interface fitting accepts one type of conventional ratchet drive, such as a square drive, of selected size commonly available. Other interface fittings accept other types of ratchet drives, such as pass-through drives. The interface fitting may be inserted from either side of the socket and includes a circumferential groove that receives the keeper to hold the interface fitting axially affixed within the hexagonal port. Both single and double-sided interface fittings are provided, as well as swivel fittings.

12 Claims, 7 Drawing Sheets

RATCHET WRENCH INTERFACE SYSTEM

This application claims priority from U.S. Provisional Patent Application Ser. No. 62/144,595, filed Apr. 8, 2015.

BACKGROUND OF THE INVENTION

1. Field of the Invention

This invention relates generally to hand tools and particularly to ratchet and socket style wrench systems having fittings for right-angled access. More particularly, this invention relates to an interchangeable system for coupling right-angled wrench fittings to multiple styles of ratchets.

2. Description of Related Art

Manual wrenches comprise elongate handles on the ends of which are disposed workpiece-engaging means such as a box-end or open-end jaw adapted to fit the typically parallel sides of a hexagonal nut. The jaw engages the nut and the user rotates the handle substantially coplanar with the nut through an angular portion of a circle to tighten or loosen the nut relative to the workpiece (typically a bolt). The user then disengages the jaw and shifts the handle back through the same arc, then re-engages the jaw with the nut for another turn. A plurality of such steps usually tightens or loosens the nut sufficiently to achieve the user's purpose, including removing the nut altogether if that is the user's aim. A more recent variation on this type of wrench includes a ratchet mechanism within a box-end wrench which provides more convenient resetting of the wrench handle position for repeated turns without having to remove from and re-engage the box end onto the nut.

In some situations, manual wrenches won't work, such as where there is insufficient space surrounding and coplanar with the nut to rotate the manual wrench handle. See, e.g., FIG. 1A. Some manual wrenches also include hinged handles which allow some accommodation of tight space constraints, but hinged manual wrenches don't allow as much torque to be applied in their offset handle position as can be applied when the handle is coplanar with the workpiece.

Ratchet wrench systems provide an alternative to manual wrenches whereby a socket fitting coaxially surrounds the nut and includes a port extending above the nut into which a drive fits for turning the socket. A ratchet handle engages the socket and applies torque to the nut through the socket. The ratchet handle thus is offset from the plane of the nut, thereby possibly also overcoming the tight, handle-rotating space problem described above. If needed, the ratchet may couple to the socket by an elongate extension which allows the ratchet handle to be offset considerably more from the socket. This enables a user to reach into tight places to address a workpiece inaccessible with a convention, coplanar wrench. See generally FIGS. 1A-3.

In some situations, however, sockets adapted to surround the nut cannot be used, largely because the workpiece on which the nut is mounted is too long to be enclosed by the socket, or the axial top of the nut cannot be reached because of obstructions. In such cases, offset tools have developed which allow use of an open-end jaw having a drive port. Called "crows feet", such tools comprise means for accessing a nut which otherwise could not be reached by either ratchet or manual wrenches. See FIGS. 2, 3.

Ratchet wrench drive systems are commonplace but usually incompatible with each other. The most common square-drive ratchet wrench system comprises a ratchet handle bearing a short, square post which mates with compatibly sized square ports within multiple sockets for use with varied bolt and nut sizes. The system works well for most situations, but not well for nuts turned down onto elongated bolts which extend through the nut too far for the socket to enclose. Deep square-drive sockets are available but limited in their depth and consequently the length of bolt they can accommodate. The conventional solution requires using box-end or open-end wrenches that allow the bolt to pass through the tool, but suffer from the above described problem of coplanar accessibility.

Pass-through ratchet systems developed to address such applications. Pass through drives and sockets, however, seldom are compatible with square post sockets and vice versa. This leads to the need to acquire, store, inventory and select from myriad ratchet wrench systems for various applications. A need exists for a single set of tools which accepts different ratchet wrench systems.

Some types of tools traditionally are not configured for use with ratchet wrench systems. For example, pipe wrenches with expandable jaws for gripping round surfaces such as steel pipe typically rely upon fixed handles coplanar with the gripping jaws. Swivel-headed wrenches having their jaws hinged to an elongate handle provide flexibility for tight applications but limit the torque that can be applied in all but coplanar positions. A need exists for such traditionally unratcheted tools capable of being used with ratchets and for a single tool system that works with multiple ratchet systems.

SUMMARY OF THE INVENTION

A right-angle socket for ratchet tools includes a hexagonal drive port adapted to receive interchangeable interface fittings, or adapters, which accept ratchet drives from various styles of ratchets. The interface fitting journals within and coaxial with the hexagonal drive port and is held in place by a keeper such as a spring ball. A coaxial port within the interface fitting accepts one type of conventional ratchet drive, such as a square drive, of selected size commonly available. Other interface fittings accept other types of ratchet drives, such as pass-through drives. The interface fitting may be inserted from either side of the socket and includes a circumferential groove that receives the keeper to hold the interface fitting axially affixed within the hexagonal port. Both single and double-sided interface fittings are provided, as well as swivel fittings.

BRIEF DESCRIPTION OF THE DRAWINGS

The novel features believed characteristic of the present invention is set forth in appended claims. The invention itself, as well as a preferred mode of use and further objects and advantages thereof, will best be understood by reference to the following detailed description of an illustrative embodiment when read in conjunction with the accompanying drawings, wherein:

DESCRIPTION OF A PREFERRED EMBODIMENT

Figure 1A:
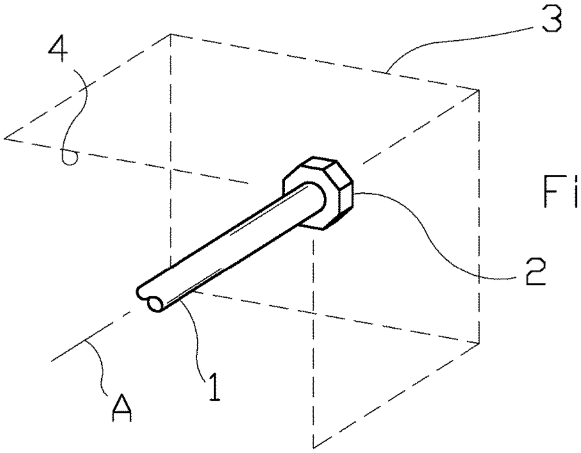
Fig. 1A PRIOR ART
FIGS. 1A-1B show a workpiece problem ensconced within tight quarters in which a conventional wrench may not function efficiently or at all.
Figure 1B:
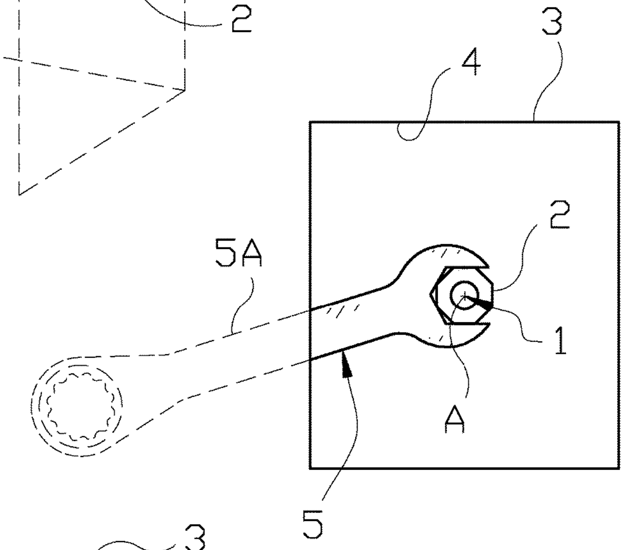
Fig. 1B PRIOR ART
Figure 2:
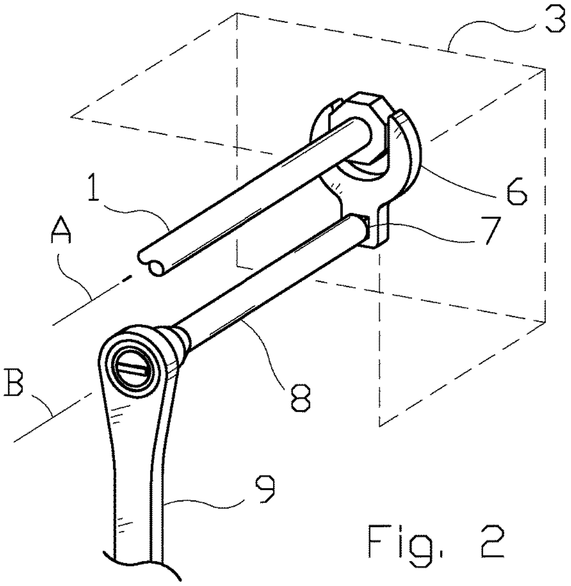
Fig. 2 PRIOR ART
FIG. 2 illustrates how the problem of FIGS. 1A-1B commonly is solved using a square-drive ratchet on an offset tool to address the workpiece.

Referring now to the figures, and particularly to FIGS. 1A-2, workpiece 1 is shown extending into recess 4 of cabinet 3 and bearing hexagonal nut or coupling 2. A user (not shown) will have difficulty reaching into recess 4 with a conventional wrench 5. Specifically, handle 5A of wrench 5 is too long to operate within the confines of recess 4.

The typical solution appears in FIG. 2 side-drive socket 6, or "crows foot" socket is placed within recess 4 in engagement with nut 2 and accessed remotely using ratchet 9 coupled to socket 6 by extension 8. Turning the handle of ratchet 9 in a plane parallel to the plane of socket 6 and nut 2 applies the required torque to nut 2 from without recess 4.

Ratchet 9 also may be equipped with direct-sockets (not shown) sized to nut 2 and which surround axially nut 2 when workpiece 1 is short enough (not shown), such as where nut 2 is threaded onto the end of a bolt (not shown). A plurality of such coaxial sockets typically comes in a set for various sizes of nut 2. Further, a deep-socket version of such coaxial sockets (not shown) accommodates some protrusion of workpiece 1 beyond nut 2 and coaxially into such deep coaxial sockets, thereby enabling tightening and loosening nut 2 even though it is not right at the end of workpiece 1. As depicted in the figures, however, workpiece 1 may comprise a pipe or other elongate object bearing nut 2 such that conventional, coaxial sockets (not shown) for square drive ratchet 9 are too shallow to work. The only way to turn nut 2 in such situations is from side access using a side-access tool such as crows foot socket 6.

Figure 3:
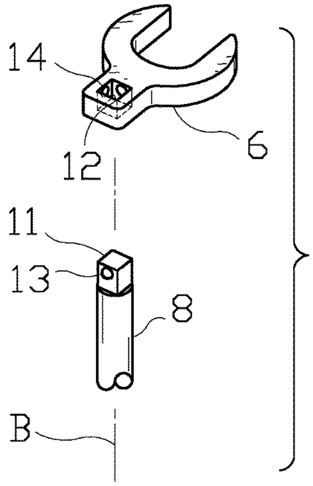
Fig. 3 PRIOR ART
FIG. 3 details the square-drive system shown in FIG. 2.

As best seen in FIG. 3, side-access socket 6 is equipped with a conventional, square port 12 into which fits square-drive nose 11 of either ratchet 9 or extension 8. Spring loaded ball 13 embedded in one side of nose 11 snaps into one of corresponding dished-out recesses 14 within the side walls of port 12 to removably retain nose 11 therein, or, alternately, to retain socket 6 on nose 11, while socket 6 is maneuvered into place and while torque is applied to nut 2.

Figure 4:
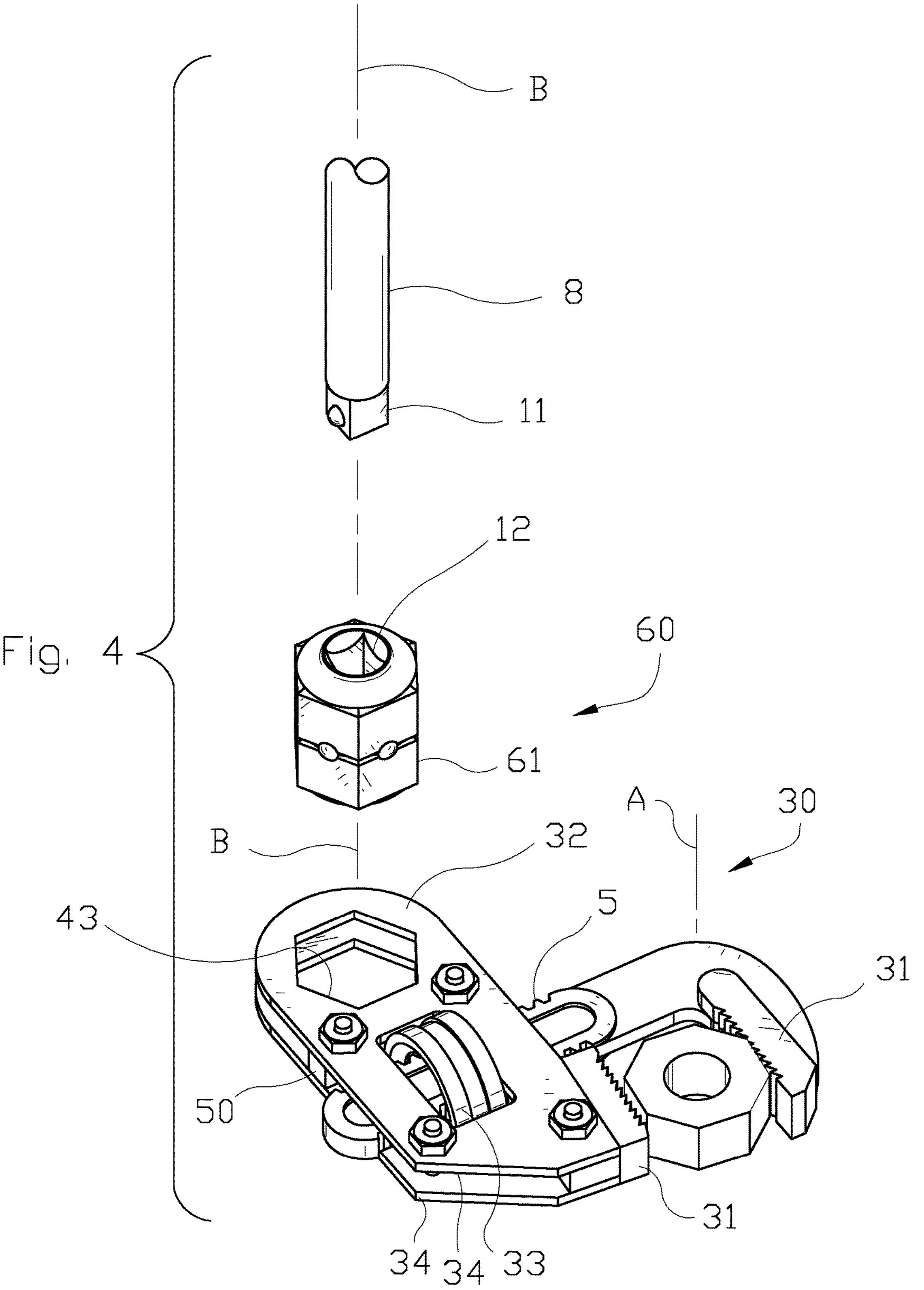
FIG. 4 shows the universal tool interface system of the present invention.
Figure 6:
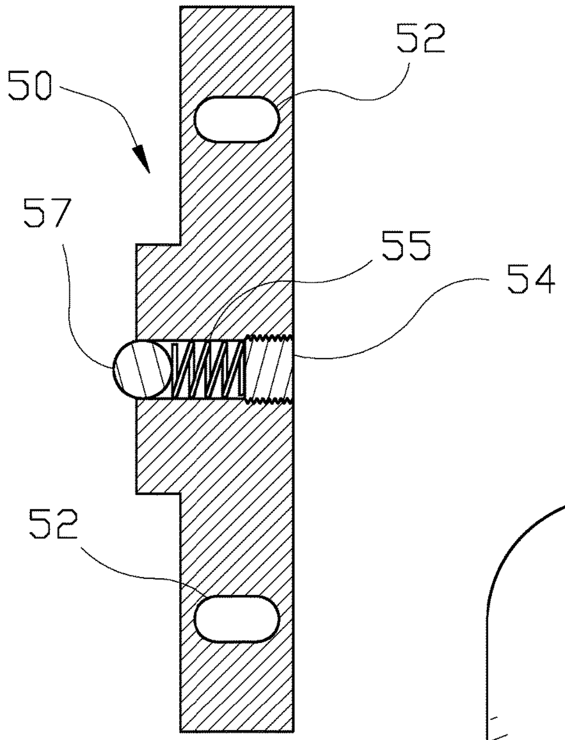
FIG. 6 details a keeper for the workpiece tool of FIG. 5.
Figure 5:
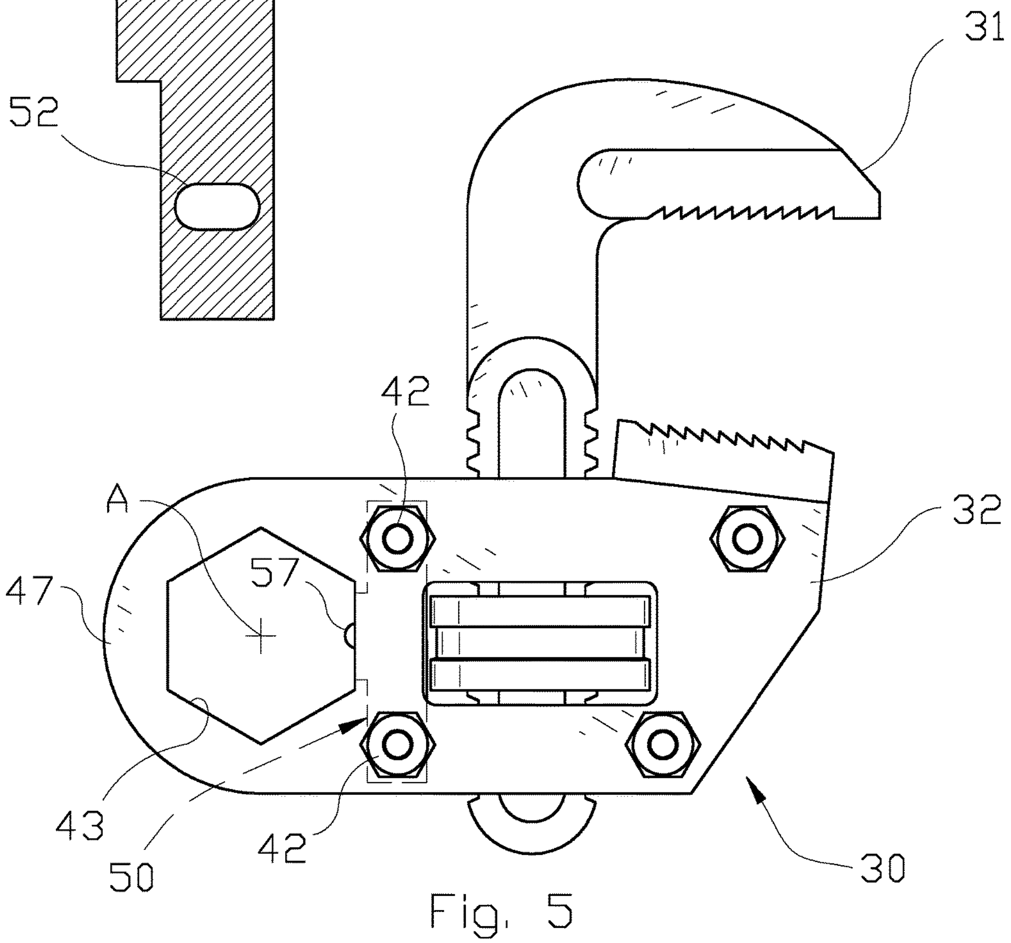
FIG. 5 shows a right side elevational view of a particular workpiece tool adapted for use with the present invention.

Turning now also to FIGS. 4-6, an alternative to crows foot 6 comprises pipe-wrench type tool 30 adapted for side access to objects in the tightly constrained access situation described above. Tool 30 could be used to address either nut 2 (FIG. 4), or applied directly onto workpiece 1 (not shown). One having ordinary skill in the art will recognize that a variety of tools 30, in addition to those shown in the figures, could be employed in this situation, and that all such alternative tools 30 are considered to be within the spirit and scope of the present invention.

The interface system of the present invention further includes interface fitting, or adapter 60 having hexagonal torso 61 adapted to be received within corresponding hexagonal adapter port 43 within tool 30. In the embodiment shown in the figures, tool 30 comprises a pipe wrench having no extended handle 5 (see FIG. 1B) but instead adapted to apply torque to workpiece 1 using a ratchet and extension similarly to that shown in FIG. 2. Tool 30 includes jaws 31 coupled to body 32 which extends rearward from jaws 31 a spaced distance. Bolts 42 clamp the two sides of body 32 together such that tool 30 comprises a rigid body which may be rotated about axis A to apply torque to nut 2. Hexagonal aperture 43 extends normal to and through the thickness of body 32 and coaxial with axis B.

Torso 61 is adapted to be received within port 43 such that detent groove 62 aligns with keeper 50 in tool 30, thereby spanning between plates so that torque applied to square nose 11 using square drive ratchet 9 is applied to both sides of jaws 31. Extension 8 is shown coaxial with axis B and extending upwards to couple to ratchet 9 (not shown) which then may be employed to apply rotational force to tool 30 and thereby to nut 2.

Keeper 50 comprises spring ball held in place by keeper body 51 slidably affixed between plates of tool 30 by bolts 42 which also hold plates together. Keeper 50 doubles as a spacer between plates adjacent port 43. Keeper body 51 bears slotted bolt holes 52 adapted to receive bolts 42, allowing for minor adjustment of keeper 50's position relative to port 43, for adjusting tightness between torso 61 and tool 30. Spring ball is positioned at one end of channel transverse to keeper body 51 and held in place by set screw 54. Biasing spring 55 urges ball against the opposite end of channel so that it compressibly engages detent groove 62 when torso 61 is inserted within port 43, thereby removably affixing tool 30 to spine system drive adapter 60 and ratchet.

Figure 9A:
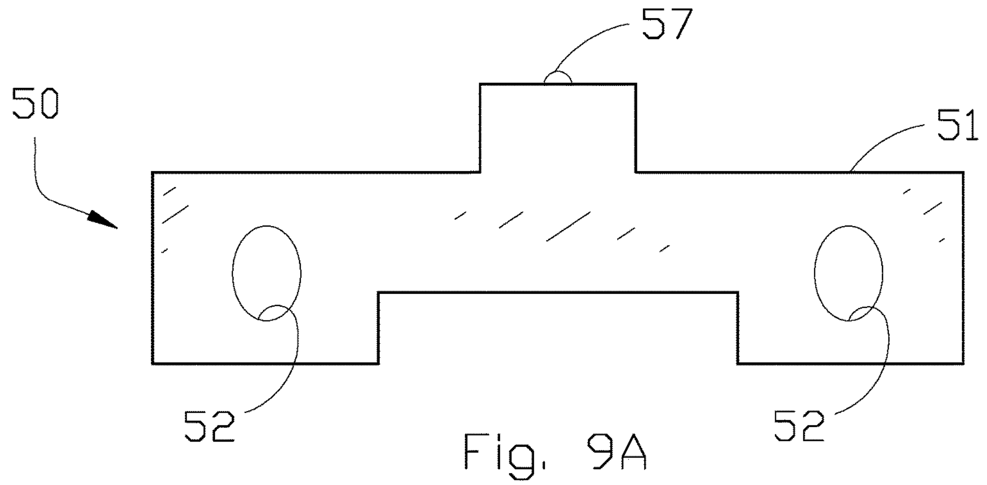
FIGS. 9A-9C show alternate embodiments for the keeper of FIG. 6.
Figure 9B:
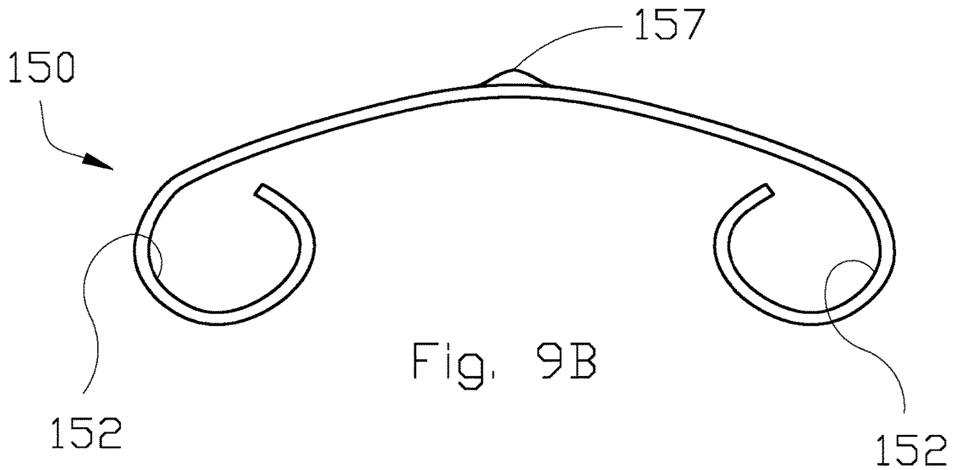
Figure 9C:
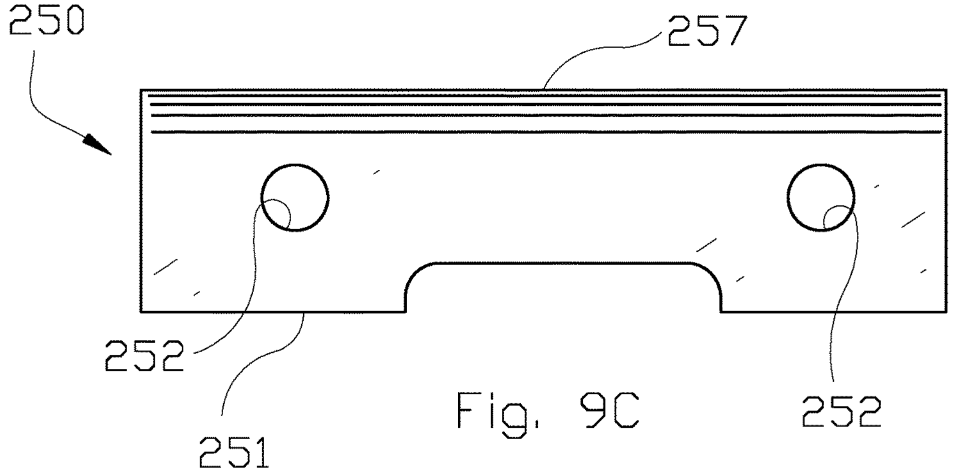
Figure 10:
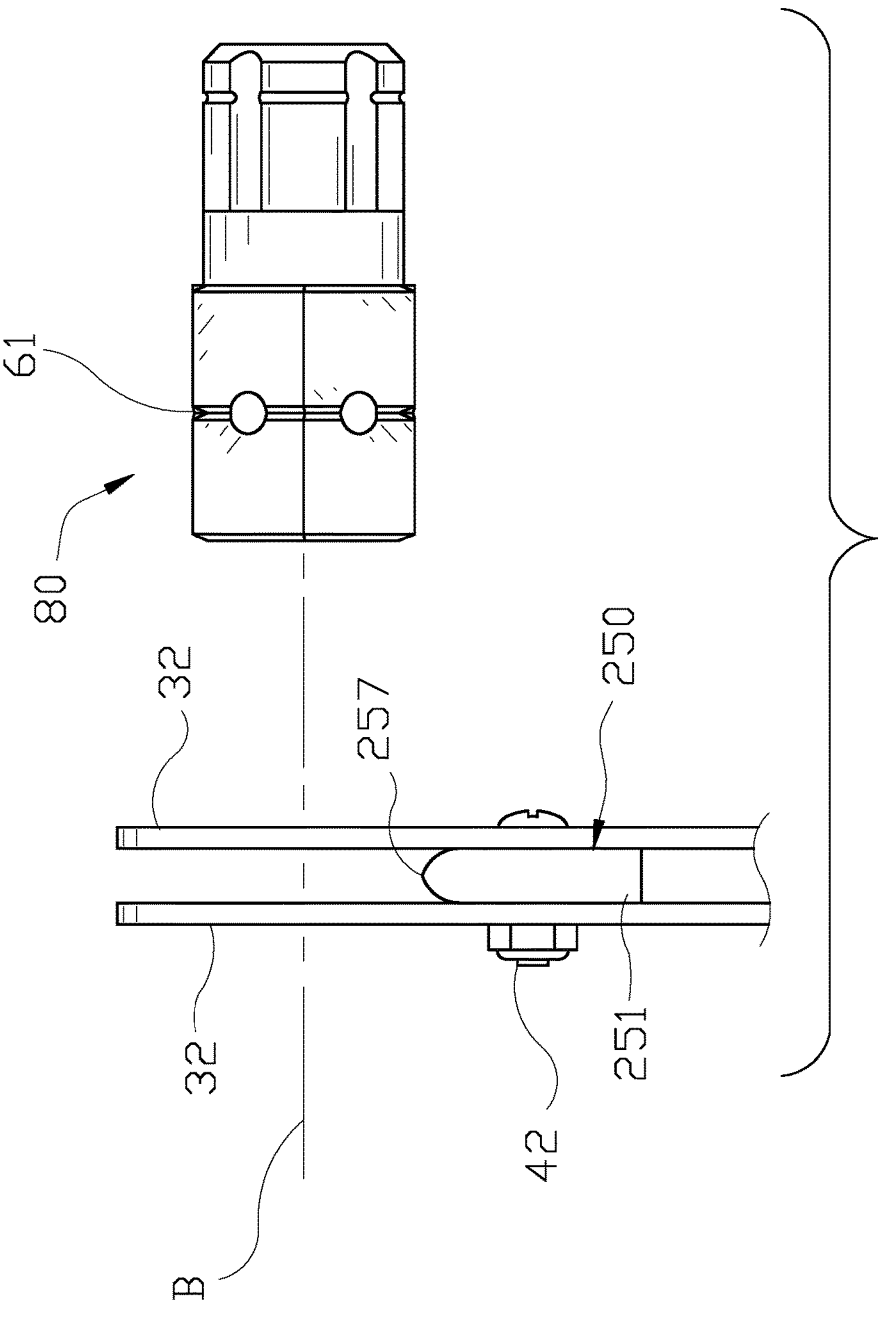
FIG. 10 details the rubber keeper of FIG. 9C in context.

Turning now also to FIGS. 9A-10, alternate embodiments to keeper 50 comprise spring steel keeper 150 and rubber keeper 250. Spring steel keeper 150 comprises a length of resilient spring steel bent into a shallow, obtuse angle at its midpoint and coiled at either end to form channels 152 which surround bolts 42 similarly to bolt channels 52 of keeper 50. Also similarly, channels 152 only loosely surround bolts 42, permitting adjustment of the position of keeper 150 similarly to that of keeper 50 as described above. Atop the midpoint of keeper 150 and positioned on the opposite side of keeper 150 from channels 152, nib 157 takes the place of spring ball 57 to engage detent groove 62 of adapter 60.

As depicted in FIGS. 9C, 10, keeper 250 comprises a rectangular slab body 251 of uniform thickness adapted to fill the space between plates. Keeper 250 is held in place by bolts 42 passing through apertures 252, which may be slotted (not shown) for adjustment purposes, as discussed above for channels 52, 152. Keeper body 250 further includes ridge 257 extending along its longitudinal length parallel to plates. Ridge 257 engages detent groove 62 of adapter 60 to retain adapter 60 within aperture 43. Preferably, keeper body 250 is made of an erosion-resistant rubber, but one having ordinary skill in the art will recognize that it could comprise harder materials such as aluminum, hard lead and even steel without departing from the spirit and scope of the present invention.

Figure 7:
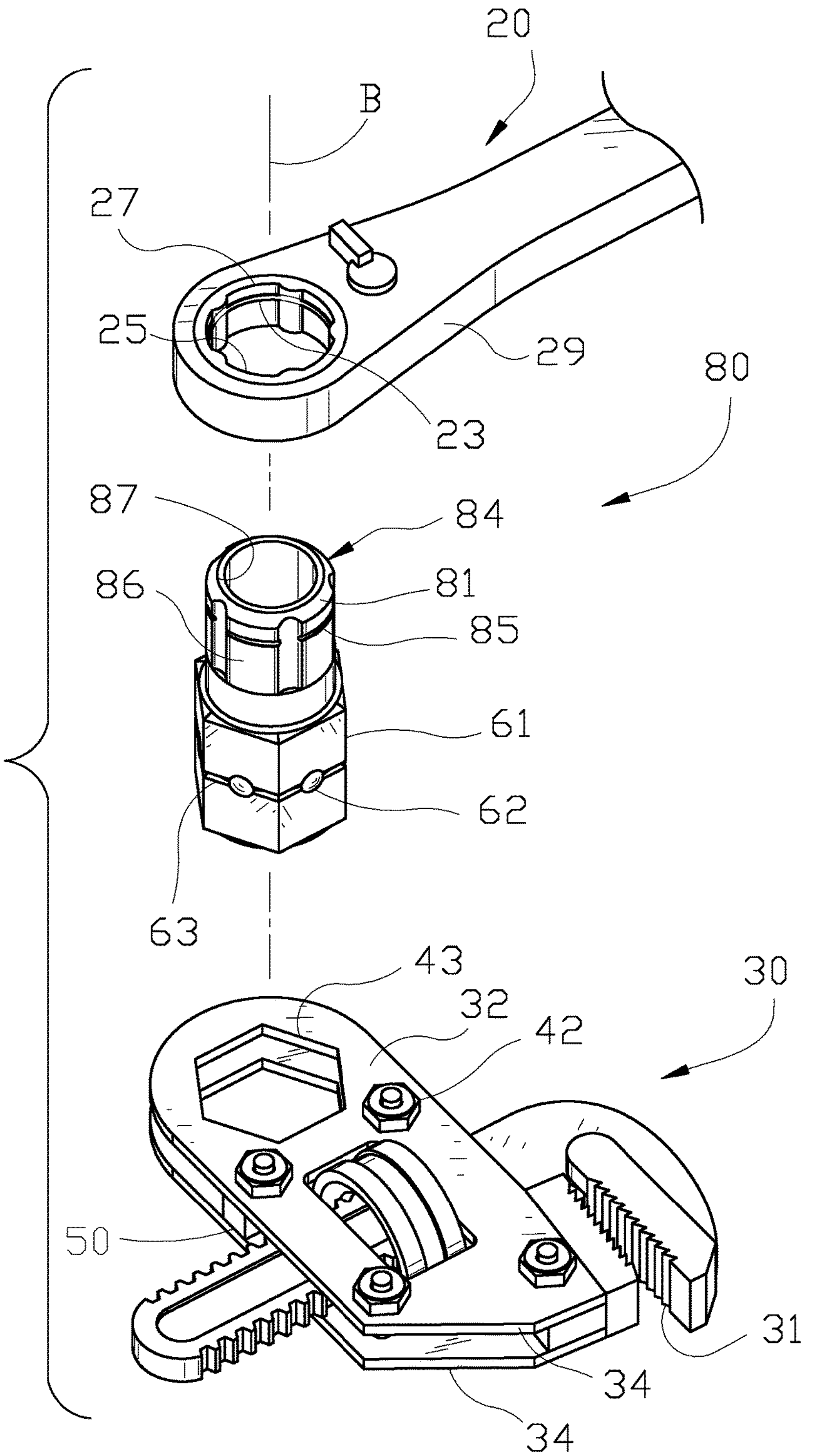
FIG. 7 shows another style of ratchet drive in use with the present invention.

Turning now also to FIG. 7, an alternate embodiment of the present invention is shown. As mentioned above, some workpieces 1, comprise elongated, threaded bolts which extend beyond the depth of typical deep-sockets. Accordingly, pass-through systems employing pass-through sockets and wrenches (neither shown) developed to enable use of ratchets coaxially surrounding such workpieces 1 instead of requiring side-socket 6.

One such pass through system employs spline drive ratchets 29 adapted to mate with splines arrayed around tubular nose 81 extending from conventional nut-drive sockets (not shown). Spines mate with corresponding spline grooves 25 disposed within the perimeter of annular port 27 in pass-through ratchet 29. Such systems enable engaging nut 2 coaxially by allowing workpiece 1 to extend through ratchet 29 along axis B. Annular spring 23 recessed within ratchet 29 mates with corresponding annular groove 85 on nose 81 to retain the sockets within ratchet 29 in similar fashion to keeper 50 discussed above.

Spline-drive adapter 80 is similarly adapted to be received within adapter port 43. In lieu of aperture 12, spline drive system adapter 80 includes nose 81 coupled to torso 61 and extending upward coaxial with axis B to couple to ratchet 29 of spline-drive system 20. One having ordinary skill in the art will recognize that a spline-drive extension (not shown) could interface between nose 81 and ratchet 29 to reach far enough into recess 4 of cabinet 3 (FIG. 1A). As in FIG. 4, torso 61 is adapted to be received within port 43 and retained there by keeper 50, 150, 250.

One having ordinary skill in the art will recognize that the spline-drive system depicted in FIG. 7 is incompatible with the square-drive system depicted in FIGS. 2-5 and that the fittings for each are not interchangeable. One having ordinary skill in the art also will recognize that other systems, such as a pass-through ratchet system called "O-Ratchet" and available from Summit Tools, Inc., of Burnaby, British Columbia, Canada, employ yet other fittings which are compatible neither with the square drive system of FIGS. 2-3 nor the spline drive system of FIG. 7. One having ordinary skill in the art further will recognize that such other drive systems maybe employed to drive tool 30 by substitution of an adapter (not shown) analogous to adapters 60 but configured to mate with said other drive system. One having ordinary skill in the art further will recognize that all such drive system adapters are considered to be within the spirit and scope of the present invention.

Figure 8A:
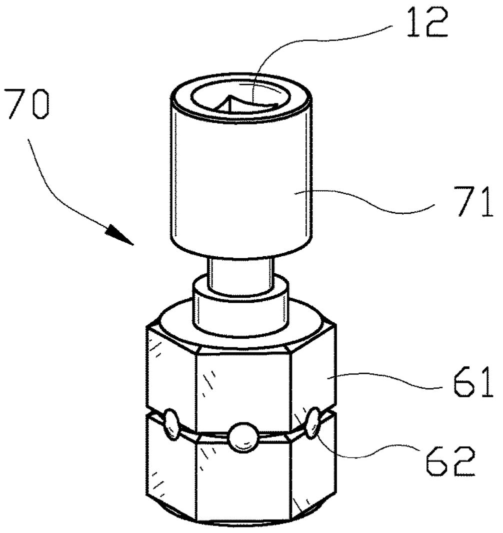
FIGS. 8A-8C illustrate various workpiece tool interface fittings of the present invention.
Figure 8B:
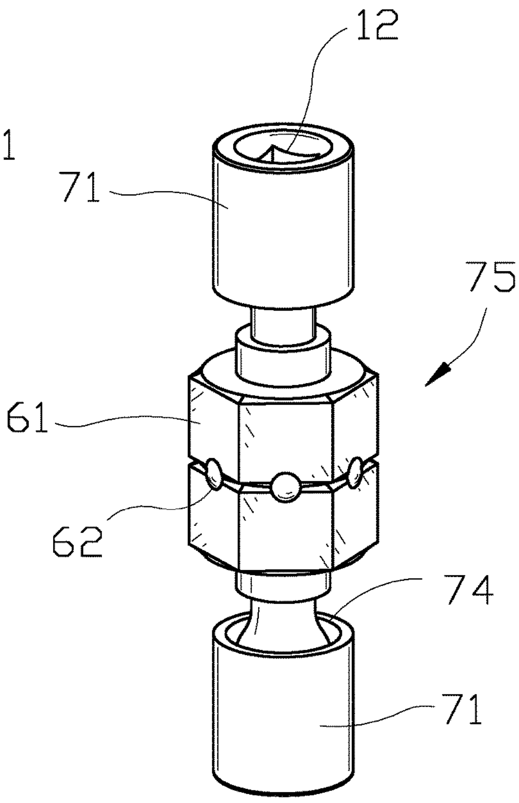
Figure 8C:
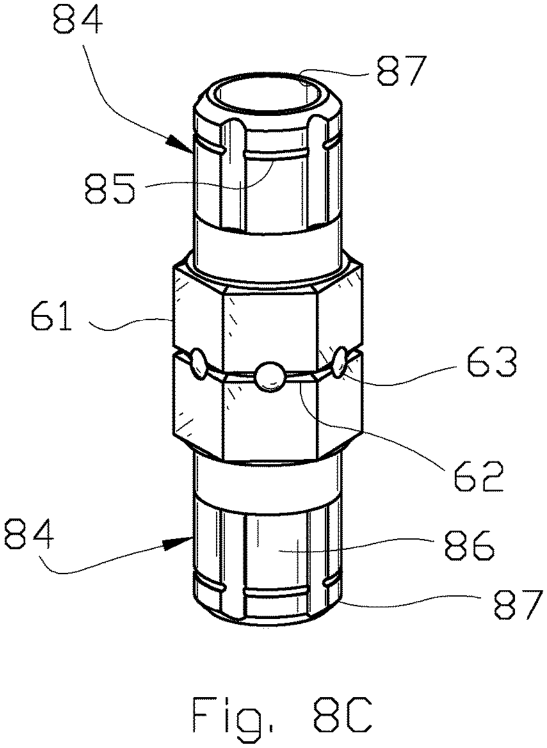

Turning now to FIGS. 8A-8C, a plurality of single and double-ended adapters are depicted. FIG. 8A depicts and adapter for mating with a square drive, similar to adapter 60 depicted in FIG. 4 but including a swivel joint interface between such square drive and adapter interface 60. FIG. 8B depicts a double-sided version of the adapter shown in FIG. 8A. FIG. 8C shows a double-sided version of the interface adapter 80 depicted in FIG. 7. One having ordinary skill in the art will recognize that the present invention contemplates all such variations in interface adapters.

In operation, a user (not shown) desiring to utilize a ratchet drive set (not shown) in his possession first selects appropriate tool 30 for use with workpiece 1. He then selects one of adapters 60, 80 adapted to work with his ratchet drive set. He then inserts adapter 60, 80 into port 43 so that his particular ratchet drive set can apply torque to tool 30. The user then proceeds to perform his project as desired. In such fashion, one set of tools 30 can be employed for use with myriad ratchet sets as long as the user has an adapter 60, 80 for his selected ratchet drive set.

While the invention has been particularly shown and described with reference to preferred and alternate embodiments, it will be understood by those skilled in the art that various changes in form and detail may be made therein without departing from the spirit and scope of the invention. For example, the invention described above works with ratchets 9, 29 to apply torque to tools 30, but drive handles adapted to interface with adapters 60, 80 need not necessarily be ratcheted drives, but could be simple drive handles (not shown). Further, other types of tools 30, such as a crescent wrench style jaws (not shown) could be employed with similar facility and utility. Still further, a hand-held tool (not shown) similar to a screwdriver handle could be configured to accept interface adapters 60, 80, enabling use of the drive sets similarly to the use of conventional nut drivers (not shown). Finally, torso 61 of adapters 60, 80 has been discussed above as having a hexagonal cross section surrounding axis B, but it could include any shape having at least one torque engaging surface adapted to prevent rotation of torso 61 within aperture 43, which would be shaped to snugly receive torso 61. Torso 61, e.g., could be square, octagonal, or round and including a key slot (none shown) adapted to mate with a corresponding key slot within plates.

I claim:

1. A ratchet wrench tool interface system comprising a tool adapted to engage a workpiece, the tool having workpiece engaging jaws;

a substantially planar body containing the workpiece engaging jaws and surrounding and defining an interface port, the interface port having an axis normal to said planar body;

an interface torso adapted to be received coaxially within the access port and having a detent groove borne within an outer surface of and surrounding the torso;

a ratchet engaging interface disposed coaxial with the interface torso; and a keeper disposed within the planar body adjacent the interface port, the keeper adapted to engage the detent groove within the interface torso and retaining the interface torso within the aperture, the keeper further having, a substantially rectangular block slidably disposed between two plates coupled to the tool, the block held between said two plates by bolts extending through slotted apertures within the block, the block bearing a detent groove engaging means on a proximal side of said block adjacent said interface access port for engaging said detent groove in said torso.

2. The ratchet wrench tool interface system of claim 1 wherein the torso body surrounds and defines a cylindrical aperture extending through the torso body and adapted to journal with the workpiece; and the ratchet engaging interface includes at least one spline nose extending coaxially from said torso body and surrounding said cylindrical aperture, the spline nose bearing a plurality of splines disposed on the outside of the spline nose and substantially parallel the axis, the spline nose and splines adapted to engage a ratchet.

3. The ratchet wrench tool interface system of claim 1 wherein the detent groove engaging means comprises a duct disposed through the block normal to the interface access port, said duct bearing a ball bearing biased toward said interface access port by a spring, said ball bearing adapted to engage the detent groove.

4. The ratchet wrench tool interface system of claim 1 wherein the detent groove engaging means comprises a ridge disposed along a proximate side of said rectangular block parallel said two plates, said ridge extending toward and adapted to engage said detent groove.

5. The ratchet wrench tool interface system of claim 4 wherein the rectangular block is made from abrasion-resistant rubber.

6. The ratchet wrench tool interface system of claim 1 wherein said keeper means comprises a spring steel body extending between two bolts extending parallel said axis through two plates coupled to the tool planar body, the spring steel body bearing a nib disposed adjacent and extending into the interface access port and adapted to engage the detent groove.

7. A ratchet wrench tool interface system adapted to interface with a ratchet wrench, the ratchet wrench having a ratchet wrench drive system, the ratchet wrench tool interface system comprising a tool adapted to engage a workpiece, the tool having
workpiece engaging jaws adapted to grasp a workpiece and enable a user to rotate said workpiece;
a substantially planar body containing the workpiece engaging jaws and surrounding and defining an interface access port, the interface port having an axis normal to said planar body;
an interface torso adapted to be received coaxially within the interface access port and having a detent groove borne within an outer surface of and surrounding the torso;
ratchet engaging means disposed coaxial with the interface torso for mating with said ratchet wrench drive system; and
a keeper disposed within the planar body adjacent the interface port and adapted to retain the interface torso within the aperture, the keeper having
a keeper body disposed between two parallel plates coupled to the planar body;
at least two bolts journaled through said parallel plates parallel to said axis and extending through slotted apertures within said keeper body; and
spring detent engagement means disposed within said keeper body adjacent said interface access port for springily engaging said detent groove.

8. The ratchet wrench tool interface system of claim 7 wherein said spring detent engagement means comprises
a ball spring disposed within a duct extending through said keeper body normal to said axis and biased toward said interface access port by a spring.

9. The ratchet wrench tool interface system of claim 7 wherein said spring detent engagement means comprises
a nib born on a proximate surface of said keeper body, said keeper body being fabricated from spring steel adapted to bias said nib toward said detent groove.

10. The ratchet wrench tool interface system of claim 7 wherein said spring detent engagement means comprises
a resilient ridge disposed along a proximate surface of said keeper body adjacent said interface access port, said resilient ridge extending into said interface access port toward said axis and adapted to removably engage said detent groove.

11. An improved method of applying a ratchet wrench to a workpiece, the method comprising
providing a plurality of tools adapted to fit a plurality of workpieces, each tool having
a workpiece engagement jaws and a tool body having two plates coupled to the workpiece engagement jaws, said two plates surrounding and defining an interface access port having an axis; and
a keeper disposed between said two plates and having a substantially rectangular block slidably held between said two plates by bolts extending through slotted apertures within the block, said keeper bearing a detent engaging means disposed adjacent said interface access port for engaging a detent;
providing a ratchet drive system having
a handle adapted to apply torque to said workpiece by rotating around said axis;
a ratchet drive extending coaxial with said axis and adapted to couple one at a time to each of the said plurality of tools;
providing an interface torso having a detent adapted to be removably received within said interface access port coaxial with said axis and with said detent engaged with said detent engaging means, said interface torso bearing ratchet drive engaging means extending coaxially from said interface torso to couple to said ratchet drive;
then
selecting a select one of said plurality of tools to fit said workpiece; then
journaling said interface torso within said interface access port within said select one of said tools; then
engaging said ratchet drive engaging means with said ratchet drive; then
operating said handle to apply torque to said workpiece.

12. A ratchet wrench tool interface system comprising
a tool adapted to engage a workpiece, the tool having
workpiece engaging jaws;
a substantially planar body having two plates coupled to the workpiece engaging jaws, said two plates surrounding and defining an interface port having an axis normal to said planar body;
an interface torso removably and coaxially journaled within the interface port and having
a detent groove borne within an outer surface of the interface torso; and
a ratchet engaging interface disposed coaxial with the interface torso; and
a keeper disposed between said two plates and having
a substantially rectangular block slidably held between said two plates by bolts extending through slotted apertures within the block; and
detent groove engaging means on a proximal side of said block adjacent said interface port for engaging said detent groove in said interface torso.

* * * * *